(12) United States Patent
Galant

(10) Patent No.: US 8,290,234 B2
(45) Date of Patent: Oct. 16, 2012

(54) SYSTEM FOR REMOVING STATIC BACKGROUND DETAIL FROM MEDICAL IMAGE SEQUENCES

(75) Inventor: Adam K. Galant, Carpentersville, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 741 days.

(21) Appl. No.: 12/536,727

(22) Filed: Aug. 6, 2009

(65) Prior Publication Data

US 2010/0061615 A1    Mar. 11, 2010

Related U.S. Application Data

(60) Provisional application No. 61/095,761, filed on Sep. 10, 2008.

(51) Int. Cl.
*G06K 9/00* (2006.01)

(52) U.S. Cl. ............ 382/132; 382/130; 382/128; 378/4; 378/8

(58) Field of Classification Search ........................ None
See application file for complete search history.

(56) References Cited

U.S. PATENT DOCUMENTS

| 4,559,557 | A | 12/1985 | Keyes | |
|---|---|---|---|---|
| 6,463,167 | B1 | 10/2002 | Feldman | |
| 7,551,721 | B2 | 6/2009 | Nakaura | |
| 8,244,013 | B2 * | 8/2012 | Galant | 382/128 |
| 2008/0051648 | A1 | 2/2008 | Suri | |
| 2008/0095417 | A1 * | 4/2008 | Pedrizzetti et al. | 382/128 |
| 2008/0298656 | A1 * | 12/2008 | Yim et al. | 382/128 |
| 2009/0010512 | A1 | 1/2009 | Zhu | |
| 2009/0016587 | A1 | 1/2009 | Strobel | |
| 2009/0076369 | A1 | 3/2009 | Mistretta | |
| 2009/0185730 | A1 | 7/2009 | Baumgart | |
| 2009/0226063 | A1 * | 9/2009 | Rangwala et al. | 382/128 |
| 2010/0160764 | A1 * | 6/2010 | Steinberg et al. | 600/407 |
| 2010/0222671 | A1 * | 9/2010 | Cohen et al. | 600/424 |

* cited by examiner

*Primary Examiner* — Chan S Park
*Assistant Examiner* — Nancy Bitar
(74) *Attorney, Agent, or Firm* — Alexander J Burke

(57) ABSTRACT

A system determines static background medical image data by receiving pixel luminance data comprising multiple sequential medical images of a patient anatomical portion and luminance data of an individual image that comprises multiple pixel luminance representative values of multiple individual pixels of the individual image. A filter includes a first filter function having a first response time for filtering received luminance representative values of a particular individual pixel varying in response to a first motion disturbance in the multiple sequential medical images for use in identifying a substantially minimum luminance value of the particular individual pixel in the multiple sequential medical images. The filter filters luminance representative values of individual pixels of the multiple sequential medical images to identify substantially minimum luminance values of individual pixels in the multiple sequential medical images as background image data of the multiple sequential medical images.

14 Claims, 6 Drawing Sheets

```
void BkgRem( in float2 t : TEXCOORD0,  // in coordinate of the currently computed sample
             out float4 out_0:COLOR0,  // out down sampled and gamma corrected image
             out float4 out_1:COLOR1,  // out static background estimation image
             out float4 out_2:COLOR2)  // out image with background removed
{
    //Input0 filter stage (tex0) must be set to LINEAR (sampling between 4 pixels)
    //Inputs1 filter stage (tex1) is set to POINT // define input pixel spacing
    float2 ps_InpPixSp = float2 (1.0f/1024, 1.0f/1024);

// down-sampling input image (input quad is setup such that t is at 1/2 pixel (u,v)
    float inPix0 = tex2D( tex0, t + float2(-ps_InpPixSp.x, -ps_InpPixSp.y ));
    float inPix1 = tex2D( tex0, t + float2(-ps_InpPixSp.x, +ps_InpPixSp.y ));
    float inPix2 = tex2D( tex0, t + float2(+ps_InpPixSp.x, -ps_InpPixSp.y ));
    float inPix3 = tex2D( tex0, t + float2(+ps_InpPixSp.x, +ps_InpPixSp.y ));
    float  Pix   = (inPix0 + inPix1 + inPix2 + inPix3)/4.0f;

//reading average(computed background) from the previous time step
    float inAvglm = tex2D( tex1, t);

//applying gamma to improve contrast
    Pix =  0.3f * exp(4.0f*(0.5f-Pix));

//exponential filter float Alpha = 0.0f;

if (ps_FirstPath)  inAvglm = Pix;       // initialize average after reset if (Pix < inAvglm) Alpha = 0.5f;        // adjust for fast fall time
    else               Alpha = 0.005f;      // adjust for slow rise time float Avglm = lerp(inAvglm, Pix, Alpha ); //linear interpolation // writing out the results
    out_0 = Pix;                 // output current down sampled image
    out_1 = Avglm;               // output new computed background
    out_2 = Pix - Avglm + 0.2f;  // output image with background subtracted
```

FIG. 6

```
// Generated by Microsoft (R) HLSL Shader Compiler 9.19.949.2111
//   fxc /E BkgRem /T ps_3_0 /Cc PassThru.psh
// Parameters:
//   bool ps_FirstPath;
//   sampler2D tex0;
//   sampler2D tex1;
// Registers:
//   Name         Reg   Size
//   ------------ ----- ----
//   ps_FirstPath c0    1
//   tex0         s0    1
//   tex1         s1    1
// Default values:
//   ps_FirstPath
//     c0  = { 0, 0, 0, 0 };
    ps_3_0
    def c1, -0.0009765625, 0.0009765625, 0.25, 0.5
    def c2, 0.200000003, 0, 0, 0
    def c3, 5.77078009, 0.300000012, 0.00499999989, 0.5
    dcl_texcoord v0.xy
    dcl_2d s0
    dcl_2d s1
    add r0.xy, c1.x, v0
    texld r0, r0, s0
    add r0.yz, c1.xxyw, v0.xxyw
    texld r1, r0.yzzw, s0
    add r0.x, r0.x, r1.x
    add r0.yz, c1.xyxw, v0.xxyw
    texld r1, r0.yzzw, s0
    add r0.x, r0.x, r1.x
    add r0.yz, c1.y, v0.xxyw
    texld r1, r0.yzzw, s0
    add r0.x, r0.x, r1.x
    mad r0.x, r0.x, -c1.z, c1.w
    mul r0.x, r0.x, c3.x
    exp r0.x, r0.x
    mul r1, r0.x, c3.y
    texld r2, v0, s1
    cmp r0.y, -c0.x, r2.x, r1.x
    mov oC0, r1
    mad r0.z, r0.x, c3.y, -r0.y
    cmp r0.w, r0.z, c3.z, c3.w
    mad r1, r0.w, r0.z, r0.y
    mad r0.x, r0.x, c3.y, -r1.x
    mov oC1, r1
    add oC2, r0.x, c2.x
// approximately 24 instruction slots used (5 texture, 19 arithmetic)
```

FIG. 7

SYSTEM FOR REMOVING STATIC BACKGROUND DETAIL FROM MEDICAL IMAGE SEQUENCES

This is a non-provisional application of provisional application Ser. No. 61/095,761 filed Sep. 10, 2008, by A. K. Galant.

FIELD OF THE INVENTION

This invention concerns a system for determining background pixel representative image data of medical images of patient anatomy involving filtering luminance representative values of individual pixels that vary in response to motion disturbance.

BACKGROUND OF THE INVENTION

In known systems, when a radiological medical image is electronically processed or analyzed, the static background can overwhelm and obscure information of interest. Removing static background substantially enhances the visibility and therefore the automatic detection of moving or changing anatomical features. Removing static background detail also improves image visualization by eliminating the clutter of inconsequential detail of the background. A known method for background removal involves Digital Subtracted Angiography (DSA). DSA is mainly used for visualization of blood vessels filled with a contrast agent (e.g., an X-ray opaque dye). DSA involves acquiring a reference image (called a mask) which contains only background detail. For angiography a mask comprises an image acquired before injection of a contrast agent into patient anatomy. In known systems, in order to remove static background detail from images, a mask image is subtracted from subsequent images acquired when a contrast agent is in the blood which yields a clear picture of blood vessels filled with the contrast agent.

DSA cannot be performed if a background mask image is unobtainable such as if it is required to enhance an image of a catheter placed in a patient heart. Even if the catheter could be removed to acquire a background image, patient movement (including respiratory and heart beat movement) impairs a mask image. A system according to invention principles addresses these deficiencies and related problems.

SUMMARY OF THE INVENTION

A system uses adaptive filtering to decompose a sequence of medical images into component layers including a static background layer representing a component that does not move or moves very slowly and a layer including most of the movement to adapt to patient movement on a table or faster breathing motion, for example. A system determines background pixel representative image data of medical images of patient anatomy. The system includes an acquisition processor for receiving pixel luminance data comprising multiple sequential medical images of a patient anatomical portion and luminance data of an individual image comprises multiple pixel luminance representative values of multiple individual pixels of the individual image. A filter includes a first filter function having a first response time for filtering received luminance representative values of a particular individual pixel varying in response to a first motion disturbance in the multiple sequential medical images for use in identifying a substantially minimum luminance value of the particular individual pixel in the multiple sequential medical images. An image data processor applies the filter in filtering luminance representative values of individual pixels of the multiple sequential medical images to identify substantially minimum luminance values of individual pixels in the multiple sequential medical images as background image data of the multiple sequential medical images.

BRIEF DESCRIPTION OF THE DRAWINGS

FIG. 6 shows source code of an image down-sampling and background removal filter, according to invention principles.

FIG. 7 shows the compiled source code of FIG. 6, according to invention principles.

DETAILED DESCRIPTION OF THE INVENTION

A system uses adaptive filtering to decompose a sequence of medical images into component layers. The parameters of the filter are adaptively selected to separate components in response to application requirements. For example, the filter is adapted to derive a background image detail layer which includes data varying relatively slowly in response to patient movements on a patient table, or in response to (faster) breathing motion and also separately derive image data associated with heart rate movement. The system enhances an anatomical image depicting catheters placed in the heart and improves automated catheter detection. The system advantageously decomposes an image into slow and fast moving layers in a variety of different applications including Continuous DSA (Digital Subtraction Angiography) involving visualization of blood contrast agent flow compensating for slow patient movements.

Figure 1:
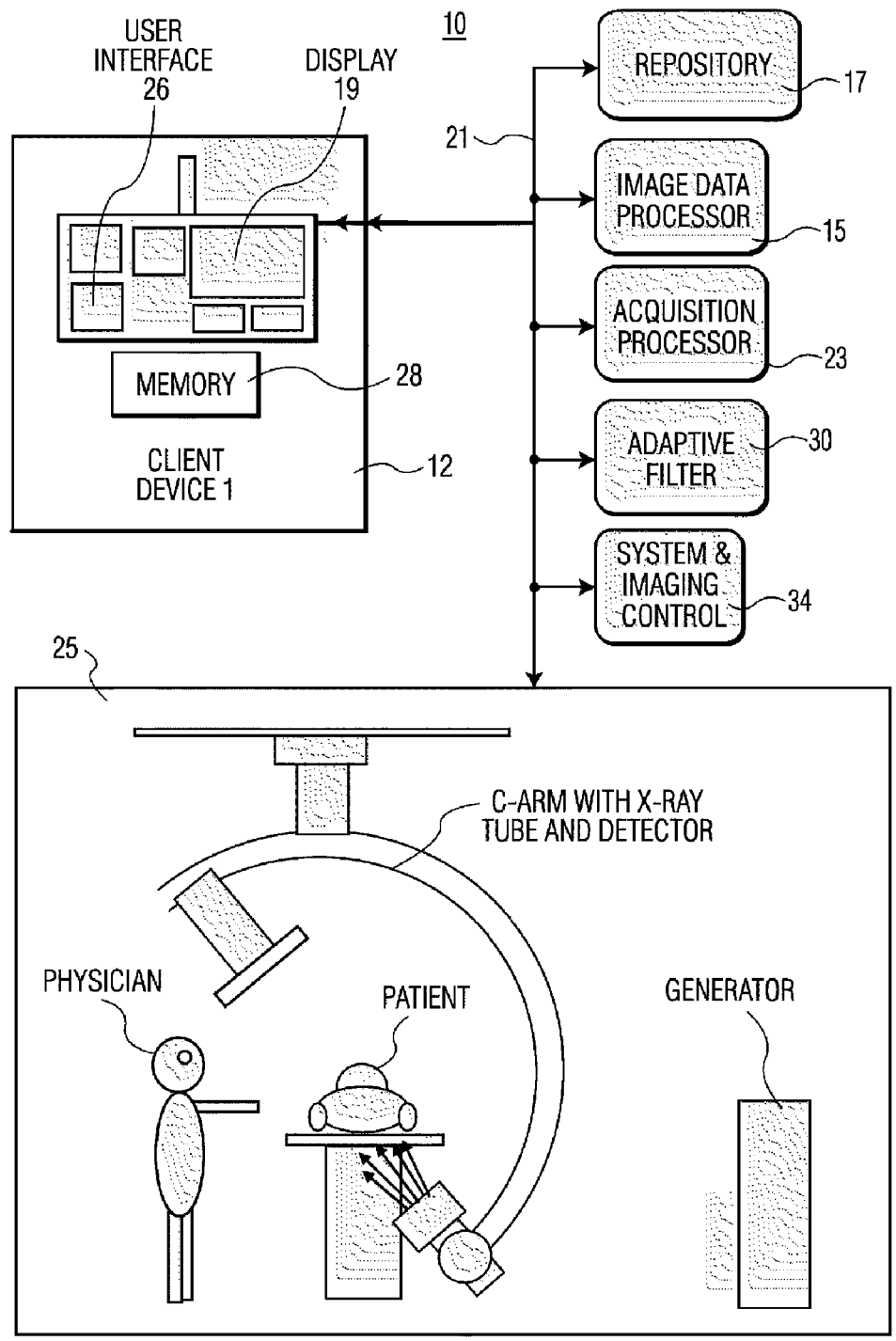
FIG. 1 shows a system for determining background pixel representative image data of medical images of patient anatomy, according to invention principles.

FIG. 1 shows an imaging system 10 involving determining background pixel representative image data of medical images of patient anatomy. System 10 includes one or more processing devices (e.g., workstations, computers or portable devices such as notebooks, Personal Digital Assistants, phones) 12 that individually include memory 28, user interface 26 enabling user interaction with a Graphical User Interface (GUI) and display 19 supporting GUI and image presentation in response to predetermined user (e.g., physician) specific preferences. As well as device 12, system 10 also includes at least one repository 17, and imaging device 25, image data processor 15, acquisition processor 23, adaptive filter 30 and system and imaging controller 34 intercommunicating via network 21. At least one repository 17 stores medical image studies for patients in DICOM compatible (or other) data format. A medical image study individually includes multiple image series of a patient anatomical portion which in turn individually include multiple images.

Acquisition processor 23 receives pixel luminance data comprising multiple sequential medical images of a patient anatomical portion and luminance data of an individual image comprises multiple pixel luminance representative values of multiple individual pixels of the individual image. Adaptive filter 30 includes a first filter function having a first response time for filtering received luminance representative values of a particular individual pixel varying in response to a first motion disturbance in the multiple sequential medical images to identify a substantially minimum luminance value of the particular individual pixel in the multiple sequential medical images. Adaptive filter 30 includes a second filter function having a second response time for filtering received luminance representative values of the particular individual pixel varying in response to a second motion disturbance having a higher rate of change than the first motion disturbance to substantially reduce variation in the luminance value of the particular individual pixel in the multiple sequential medical images due to the second motion disturbance. Image data processor 15 applies adaptive filter 30 in filtering luminance representative values of individual pixels of the multiple sequential medical images to identify substantially minimum luminance values of individual pixels in the multiple sequential medical images as background image data.

X-ray imaging device 25 acquires multiple sequential images of vessel structure of a portion of patient anatomy in the presence of a contrast agent. Image data processor 15 aligns individual images of the multiple sequential images with a single particular mask image containing background detail of the portion of patient anatomy in the absence of contrast agent and forms data representing multiple digitally subtracted images by subtracting data representing the single particular mask image from aligned individual images of the multiple sequential images. A reproduction device (e.g., display 19 or a printer) presents the composite image to a user. Imaging controller 34 controls operation of imaging device 25 in response to user commands entered via user interface 26.

Figure 2:
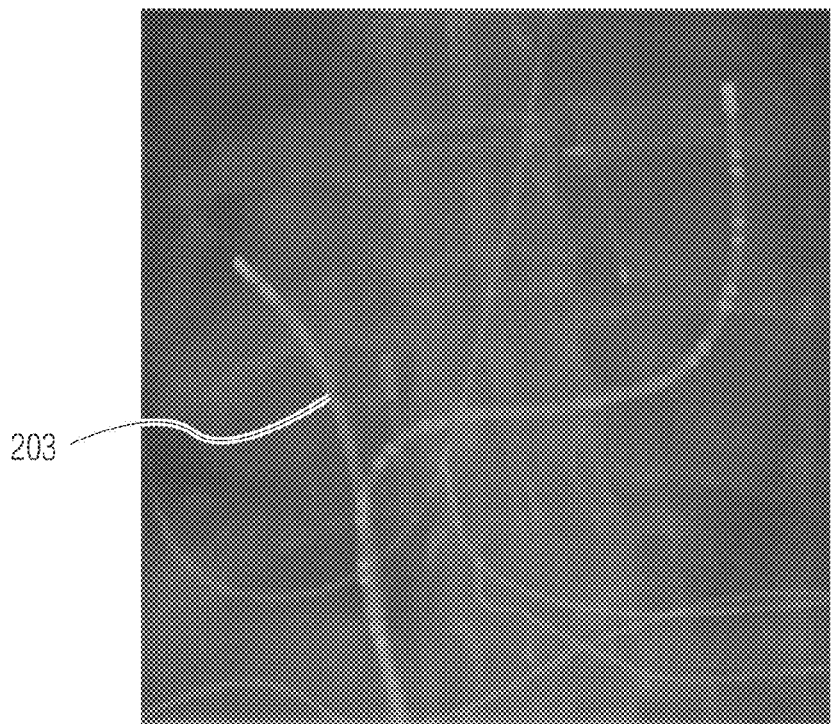
FIGS. 2 and 3 show different images in a sequence of angiography medical images illustrating movement of a catheter.
Figure 3:
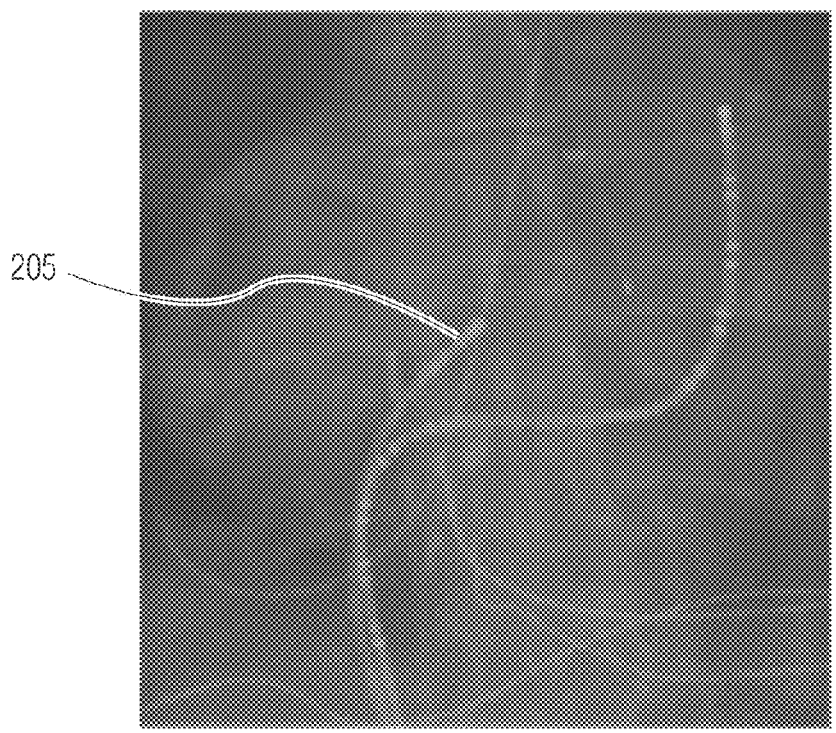
Figure 4:
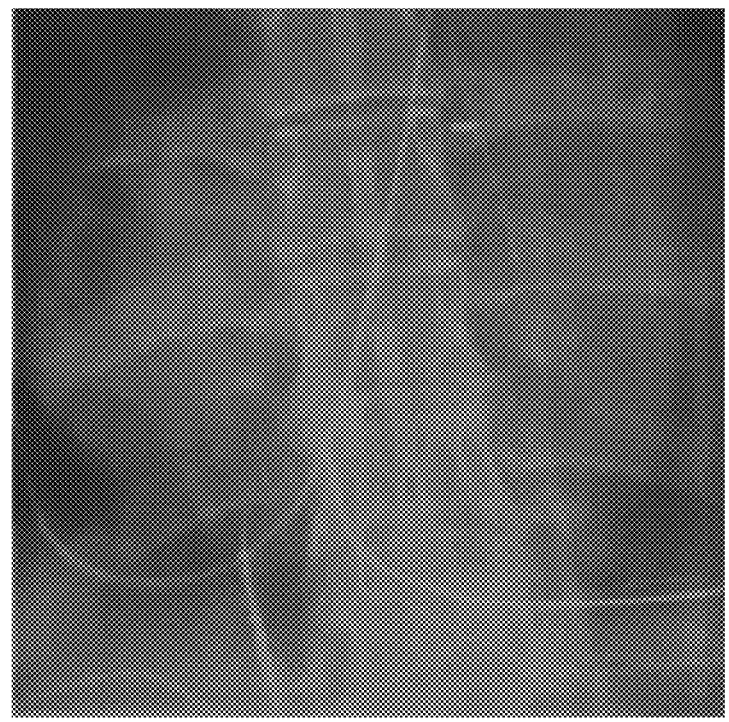
FIG. 4 shows a computed image presenting background image detail of the sequence of angiography medical images including the images of FIGS. 2 and 3, according to invention principles.
Figure 5:
FIG. 5 shows a computed image of the sequence of angiography medical images produced by subtracting the computed background image detail of FIG. 4, according to invention principles.

The medical images of FIGS. 2-5 illustrate working of system 10. FIGS. 2 and 3 show different randomly selected images in a sequence of angiography medical images provided by imaging device 25 (FIG. 1) illustrating movement of a catheter. Specifically, the catheter is shown in a first position 203 and a different second position 205 in FIGS. 2 and 3 respectively. FIG. 4 shows a computed image presenting background image detail comprising a static layer of an image of the sequence of angiography medical images including the images of FIGS. 2 and 3. Individual pixels comprising the background image of FIG. 4 are identified as pixels having substantially minimum luminance values in the sequence of angiography medical images by the first filter function (of adaptive filter 30 of FIG. 1) having a first response time for filtering received luminance representative values of individual pixels varying in response to a first motion disturbance (e.g., respiratory motion or patient movement). The background image data representing the FIG. 4 image comprises a mask for use in Digital Subtraction Angiography (DSA). FIG. 5 shows a computed image of the sequence of angiography medical images produced by subtracting the computed background image detail of FIG. 4 to provide a motion layer. Image data processor 15 subtracts the image data representing the FIG. 4 static background image data from pixel luminance data comprising sequence of angiography medical images to produce individual images including the image of FIG. 5.

System 10 (FIG. 1) involves determining background pixel representative image data of medical images of patient anatomy using a static background detection filter function in adaptive filter 30 for filtering an X-ray image sequence. The static background detection filter function comprises a non-linear temporal filter having a difference between filter rise time and fall time that ensures filtered values settle to a value close to a static background level. The filter is (but does not have to be in another embodiment) applied to each pixel of an image independently. System 10 recognizes that X-ray images are formed by attenuation (as opposed to reflection for images taken in visible light). In the images of FIGS. 2-5, the brightness of an individual pixel reflects the level of attenuation along a corresponding X-ray line.

If s represents the attenuation of static, not moving parts of an imaged object taken along an X-ray line to a pixel, and m is attenuation of a moving part, such that value 0 represents the total attenuation and 1.0 represents no attenuation, brightness of the pixel can be expressed as:

$$D(s*m),$$

or in the logarithmic domain:

$$D(\log(s)+\log(m)),$$

where $D( )$ is a monotonic display function translating attenuation values to pixel brightness. In the images of FIGS. 2-5, $D( )$ is such that the lower values of s*m are translated to a higher pixel value. If there is a movement in the image, the term m changes its value and can disappear completely (become 1.0) if the moving part moves away. Therefore, if $D( )$ is monotonic with negative slope (as in the images of FIGS. 2-5), image data processor 15 estimates static background image data as having the lowest value of D (pixel brightness) in the sequence of angiography medical images. If the image brightness is inverse (D has a positive slope) the background image data is represented by the largest expected value of D.

System 10 finds minimum (or maximum) values of individual pixels of individual images in the sequence of angiography medical images, and follows slow changes of an object such as a catheter. Image data processor 15 in conjunction with adaptive filter 30 selects a correct (minimum or maximum) value if image background detail remains static. One function of adaptive filter 30 rejects quick changes caused by a moving part (e.g., a catheter) appearing in an image. This is achieved by dynamic configuration of a temporal filter in filter 30 to have a quick response time for filtering input data values representing features of reduced luminance (i.e., having a negative change slope). The system dynamically configures a temporal filter in filter 30 to have a slow response time for filtering input data values representing features of increased luminance (i.e., having a positive change slope or vice versa for a negative image). The system adjusts filter 30 response times to vary how fast filter 30 responds and what level of movement in image detail is accepted as background image detail such as slight movement of a patient on an imaging device table. The system also adjusts filter 30 response times to separate image data associated with breathing motion from image data associated with heart beat motion.

System 10 applies different filter response times for positive and negative luminance input data slopes. System 10 selects a filter function and response time based on required performance including based on the closeness in frequency of image data motion frequency components needing discrimination. Adaptive filter 30 is configured to have a discrete filter function such as an FIR (Finite Impulse Response) filter function or IIR (Infinite Impulse Response) filter function for a large number of required taps. In one embodiment, filter 30 employs a first order IIR filter known as an exponential filter, for example. If x(t) is an input and y(t) is the filter 30 output at a discrete time t, the exponential filter is represented by the recursive equation, $$y(0)=x(0),$$

$$y(t)=(1-\alpha)y(t-1)+\alpha x(t), \text{ where: } 0.0<\alpha<1.0 \quad (1)$$

This filter is a discrete-time version of a first order RC filter. Parameter $\alpha$ controls the filter response time. A nonlinear version of this filter is constructed using different values of $\alpha$ for the negative and positive luminance input data slopes.

$$y(0)=x(0),$$

$$\text{if } (x(t)<y(t-1))\alpha=\alpha_1 \text{ else } \alpha=\alpha_2$$

$$y(t)=(1-\alpha)y(t-1)+\alpha x(t), \text{ where: } 0.0<\alpha<1.0 \quad (2)$$

Filter 30 employs filter function (2) with $\alpha_1=0.5$ and $\alpha_2=0.005$ for determining the background mask image of FIG. 4 used in image data subtraction to produce the image of FIG. 5. System 10 accurately identifies a catheter and is relatively insensitive to filter parameter change. FIG. 6 shows source code of an image down-sampling and background removal filter 30 implemented on a graphics card in MICROSOFT® High Level Shading Language, for example. FIG. 7 shows the source code of FIG. 6 compiled into a Microsoft Shader model, for example.

Figure 8:
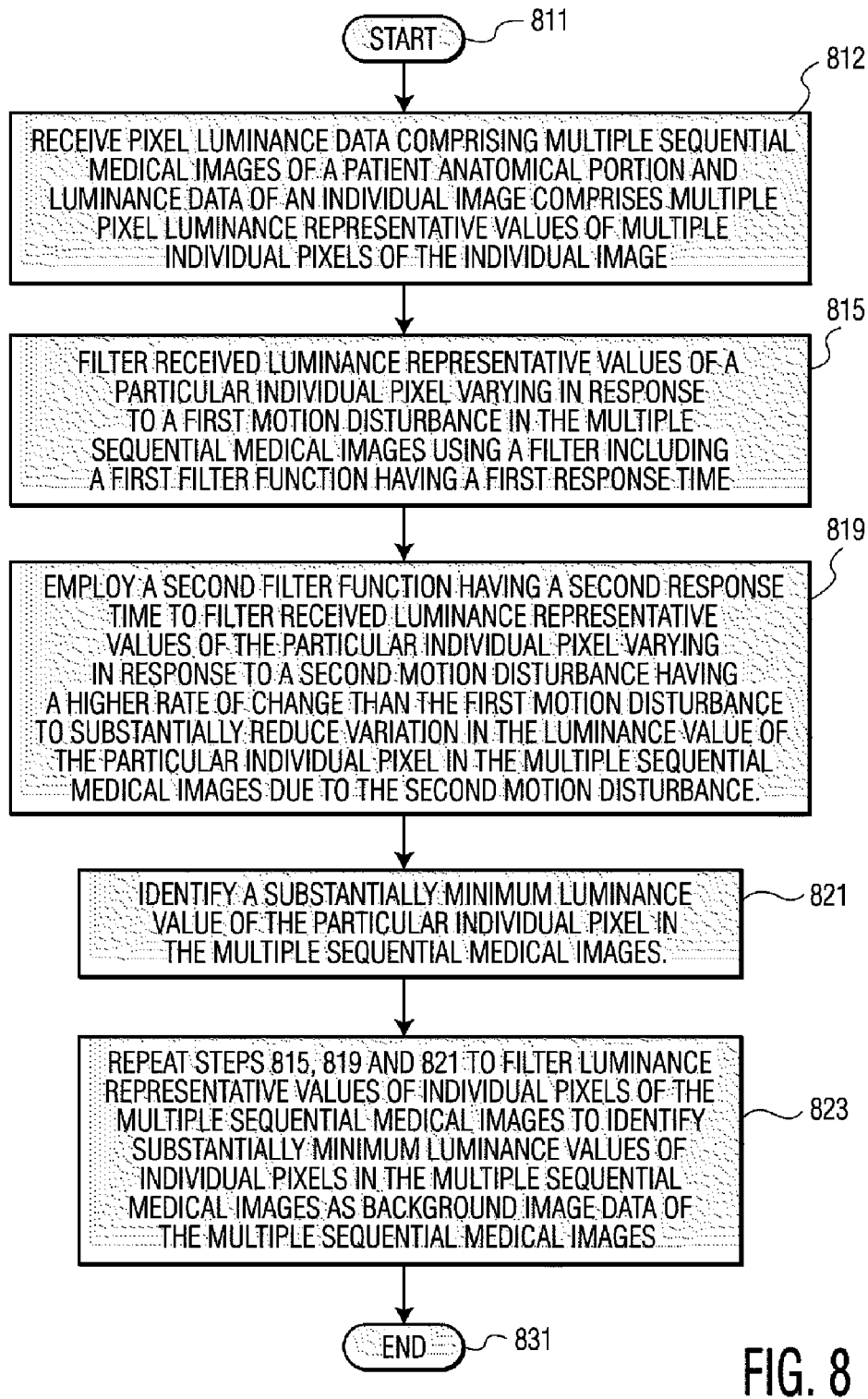
FIG. 8 shows a flowchart of a process used by a system for determining background pixel representative image data of medical images of patient anatomy, according to invention principles.

FIG. 8 shows a flowchart of a process used in system 10 for determining background pixel representative image data of medical images of patient anatomy. In step 812 following the start at step 811, acquisition processor 23 (FIG. 1) receives pixel luminance data comprising multiple sequential medical images of a patient anatomical portion and luminance data of an individual image comprises multiple pixel luminance representative values of multiple individual pixels of the individual image. In step 815 adaptive filter 30 uses a first filter function having a first response time to filter received luminance representative values of a particular individual pixel that vary in response to a first motion disturbance (such as a heart rate related disturbance or a respiratory rate related disturbance) in the multiple sequential medical images. Adaptive filter 30 in step 819 employs a second filter function having a second response time to filter received luminance representative values of the particular individual pixel varying in response to a second motion disturbance having a higher rate of change than the first motion disturbance to substantially reduce variation in the luminance value of the particular individual pixel in the multiple sequential medical images due to the second motion disturbance. The second motion disturbance comprises movement of an interventional device comprising at least one of, (a) a catheter and (b) a stent, within the patient anatomical portion.

In one embodiment adaptive filter 30 comprises a nonlinear low pass filter that is adaptively variable to vary the first response time in response to variation in frequency of the first motion disturbance and is automatically adaptively variable to vary the first response time in response to detection of variation in frequency of the first motion disturbance. In step 821 adaptive filter 30 identifies a substantially minimum luminance value of the particular individual pixel in the multiple sequential medical images. In step 823, image data processor 15 directs adaptive filter 30 in repeating steps 815, 819 and 821 to filter luminance representative values of individual pixels of the multiple sequential medical images to identify substantially minimum luminance values of individual pixels in the multiple sequential medical images as background image data of the multiple sequential medical images. Image data processor 15 subtracts the background image data, comprising a mask for use in Digital Subtraction Angiography (DSA), from the pixel luminance data comprising the multiple sequential medical images. The process of FIG. 8 terminates at step 831.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1-8 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system adaptively filters luminance data of a sequence of medical images to decompose the data into component layers including a background image detail layer which includes data varying relatively slowly in response to patient movements on a patient table, or in response to (faster) breathing motion and also to separately derive image data associated with heart rate movement, for example. Further, the processes and applications may, in alternative embodiments, be located on one or more (e.g., distributed) processing devices on the network of FIG. 1. Any of the functions and steps provided in FIGS. 1-8 may be implemented in hardware, software or a combination of both.

What is claimed is:

1. A system for determining background pixel representative image data of medical images of patient anatomy, comprising: an acquisition processor for receiving pixel luminance data comprising a plurality of sequential medical images of a patient anatomical portion and luminance data of an individual image comprises a plurality of pixel luminance representative values of a plurality of individual pixels of said individual image; a filter including a first filter function having a first response time for filtering received luminance representative values of a particular individual pixel varying in response to a first motion disturbance in said plurality of sequential medical images for use in identifying a substantially minimum luminance value of said particular individual pixel in said plurality of sequential medical images; wherein said filter includes a second filter function having a second response time for filtering received luminance representative values of said particular individual pixel varying in response to a second motion disturbance and an image data processor for applying said first and second filter in filtering luminance representative values of individual pixels of said plurality of sequential medical images to identify substantially minimum luminance values of individual pixels in said plurality of sequential medical images as background image data of said plurality of sequential medical images.

2. A system according to claim 1, wherein said first motion disturbance is a heart rate related disturbance.

3. A system according to claim 1, wherein said first motion disturbance is a respiratory rate related disturbance.

4. A system according to claim 1, wherein said filter is adaptively variable to vary said first response time in response to variation in frequency of said first motion disturbance.

5. A system according to claim 4, wherein said filter is automatically adaptively variable to vary said first response time in response to detection of variation in frequency of said first motion disturbance.

6. A system according to claim 1, wherein said second motion disturbance have a higher rate of change than said first motion disturbance, to substantially reduce variation in said luminance value of said particular individual pixel in said plurality of sequential medical images due to said second motion disturbance.

7. A system according to claim 1, wherein said second motion disturbance comprises movement of an interventional device comprising at least one of, (a) a catheter and (b) a stent, within said patient anatomical portion.

8. A system according to claim 1, wherein said image data processor subtracts said background image data from said pixel luminance data comprising said plurality of sequential medical images.

9. A system according to claim 8, wherein said background image data comprises a mask for use in Digital Subtraction Angiography (DSA).

10. A system for determining background pixel representative image data of medical images of patient anatomy, comprising:
    an acquisition processor for receiving pixel luminance data comprising a plurality of sequential medical images of a patient anatomical portion and luminance data of an individual image comprises a plurality of pixel luminance representative values of a plurality of individual pixels of said individual image;
    an adaptive filter including,
    a first filter function having a first response time for filtering received luminance representative values of a particular individual pixel varying in response to a first motion disturbance in said plurality of sequential medical images to identify a substantially minimum luminance value of said particular individual pixel in said plurality of sequential medical images and
    a second filter function having a second response time for filtering received luminance representative values of said particular individual pixel varying in response to a second motion disturbance having a higher rate of change than said first motion disturbance to substantially reduce variation in said luminance value of said particular individual pixel in said plurality of sequential medical images due to said second motion disturbance; and
    an image data processor for applying said adaptive filter in filtering luminance representative values of individual pixels of said plurality of sequential medical images to identify substantially minimum luminance values of individual pixels in said plurality of sequential medical images as background image data.

11. A system according to claim 10, wherein said adaptive filter is adaptively variable to vary said first response time in response to variation in frequency of said first motion disturbance.

12. A system according to claim 11, wherein said filter is automatically adaptively variable to vary said first response time in response to detection of variation in frequency of said first motion disturbance.

13. A system according to claim 10, wherein said adaptive filter comprises a non-linear low pass filter.

14. A processing device implemented method for determining background pixel representative image data of medical images of patient anatomy, comprising: receiving pixel luminance data comprising a plurality of sequential medical images of a patient anatomical portion and luminance data of an individual image comprises a plurality of pixel luminance representative values of a plurality of individual pixels of said individual image; filtering luminance representative values of individual pixels of said plurality of sequential medical images to identify substantially minimum luminance values of individual pixels in said plurality of sequential medical images as background image data of said plurality of sequential medical images by, filtering received luminance representative values of a particular individual pixel varying in response to a first motion disturbance in said plurality of sequential medical images using a filter including a first filter function having a first response time and identifying a substantially minimum luminance value of said particular individual pixel in said plurality of sequential medical images; wherein said filter includes a second filter function having a second response time for filtering received luminance representative values of said particular individual pixel varying in response to a second motion disturbance having a higher rate of change than said first motion disturbance.

* * * * *